United States Patent
Park et al.

(10) Patent No.: US 12,071,530 B2
(45) Date of Patent: Aug. 27, 2024

(54) DISPERSANT FOR SEPARATOR OF NON-AQUEOUS ELECTROLYTE BATTERY INCLUDING CYANOETHYL GROUP-CONTAINING POLYMER, SEPARATOR OF NON-AQUEOUS ELECTROLYTE BATTERY, AND NON-AQUEOUS ELECTROLYTE BATTERY

(71) Applicant: LG Chem, Ltd., Seoul (KR)

(72) Inventors: Dong Hoon Park, Daejeon (KR); Yoontae Hwang, Daejeon (KR); Yong Man Lee, Daejeon (KR); Jin Young Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 743 days.

(21) Appl. No.: 17/283,789

(22) PCT Filed: Oct. 18, 2019

(86) PCT No.: PCT/KR2019/013770
§ 371 (c)(1),
(2) Date: Apr. 8, 2021

(87) PCT Pub. No.: WO2020/080897
PCT Pub. Date: Apr. 23, 2020

(65) Prior Publication Data
US 2021/0380778 A1   Dec. 9, 2021

(30) Foreign Application Priority Data

Oct. 19, 2018 (KR) .................. 10-2018-0125501
Oct. 29, 2018 (KR) .................. 10-2018-0130144

(51) Int. Cl.
| | |
|---|---|
| *C08K 3/22* | (2006.01) |
| *C08F 220/42* | (2006.01) |
| *C08F 220/54* | (2006.01) |
| *H01M 50/443* | (2021.01) |
| *H01M 50/446* | (2021.01) |
| *H01M 50/449* | (2021.01) |

(52) U.S. Cl.
CPC .............. *C08K 3/22* (2013.01); *C08F 220/42* (2013.01); *C08F 220/54* (2013.01); *H01M 50/443* (2021.01); *H01M 50/446* (2021.01); *H01M 50/449* (2021.01)

(58) Field of Classification Search
CPC ............. H01M 50/446; H01M 50/441; H01M 50/423; C08F 220/42; C08F 220/46; C08F 220/52; C08F 220/54; C08K 3/22
See application file for complete search history.

(56) References Cited

U.S. PATENT DOCUMENTS

| | | |
|---|---|---|
| 5,340,672 A | 8/1994 | Kubota et al. |
| 2010/0178545 A1 | 7/2010 | Pan et al. |
| 2011/0123850 A1 | 5/2011 | Duong et al. |
| 2012/0052492 A1 | 3/2012 | Li |
| 2012/0258348 A1 | 10/2012 | Hayakawa et al. |
| 2012/0258349 A1* | 10/2012 | Hayakawa ............... C08F 8/30 525/61 |
| 2012/0258350 A1 | 10/2012 | Fukui et al. |
| 2012/0259067 A1 | 10/2012 | Fukui et al. |
| 2015/0028516 A1 | 1/2015 | Duong et al. |
| 2016/0380314 A1 | 12/2016 | Yang et al. |
| 2018/0375099 A1 | 12/2018 | Akiike |
| 2019/0085102 A1* | 3/2019 | Han ................... C08F 216/06 |

FOREIGN PATENT DOCUMENTS

| | | |
|---|---|---|
| EP | 0794198 A1 | 9/1997 |
| JP | 2011054445 A | 3/2011 |
| JP | 2011084068 A | 4/2011 |
| JP | 2011515821 A | 5/2011 |
| KR | 20090118089 A | 11/2009 |
| KR | 20090123894 A | 12/2009 |
| KR | 20120035101 A | 4/2012 |
| KR | 20120113675 A | 10/2012 |
| KR | 20120113676 A | 10/2012 |
| KR | 20120114170 A | 10/2012 |
| KR | 20140050877 A | 4/2014 |
| KR | 101532815 B1 | 6/2015 |
| KR | 101634416 B1 | 6/2016 |
| KR | 101671556 B1 | 11/2016 |
| KR | 20170001069 A | 1/2017 |
| KR | 101730671 B1 | 4/2017 |
| KR | 20180075912 A | 7/2018 |
| KR | 20180097547 A | 8/2018 |
| KR | 20180100870 A | 9/2018 |
| WO | 2009079889 A1 | 7/2009 |
| WO | 2018124509 A1 | 7/2018 |

OTHER PUBLICATIONS

International Search Report for Application No. PCT/KR2019/013770 dated Feb. 6, 2020, pp. 1-3.
Extended European Search Report for Corresponding EP Application No. 19874540.8 dated Nov. 18, 2021, 2 pgs.

* cited by examiner

*Primary Examiner* — Christopher P Domone
(74) *Attorney, Agent, or Firm* — Lerner David LLP

(57) ABSTRACT

Provided are a dispersant for a separator of a non-aqueous electrolyte battery, the dispersant including a cyanoethyl group-containing polymer, a separator of a non-aqueous electrolyte battery using the same, and a non-aqueous electrolyte battery.

9 Claims, No Drawings

DISPERSANT FOR SEPARATOR OF NON-AQUEOUS ELECTROLYTE BATTERY INCLUDING CYANOETHYL GROUP-CONTAINING POLYMER, SEPARATOR OF NON-AQUEOUS ELECTROLYTE BATTERY, AND NON-AQUEOUS ELECTROLYTE BATTERY

CROSS-REFERENCE TO RELATED APPLICATION(S)

This application is a national phase entry under 35 U.S.C. § 371 of International Application No. PCT/KR2019/013770 filed Oct. 18, 2019, which claims priority from Korean Patent Application No. 10-2018-0125501 filed Oct. 19, 2018, and Korean Patent Application No. 10-2018-0130144 filed Oct. 29, 2018, all of which are incorporated herein by reference.

BACKGROUND OF THE INVENTION

(a) Field of the Invention

The present invention relates to a dispersant for a separator of a non-aqueous electrolyte battery, the dispersant including a cyanoethyl group-containing polymer, a separator of a non-aqueous electrolyte battery using the same, and a non-aqueous electrolyte battery.

(b) Description of the Related Art

Recently, as a power source for a mobile terminal such as that of a notebook computer or a cellular phone or as a power source for a hybrid vehicle or an electric vehicle, a non-aqueous electrolyte battery with high voltage and high energy density, in particular, a lithium ion secondary battery, receives attention. Since the non-aqueous electrolyte battery typified by a lithium ion secondary battery has high capacity and high energy density, a large electric current flows at the time of internal short circuit or external short circuit of the battery. Thus, there is a problem in that heat is generated in the battery due to Joule heat caused by short circuit, the battery is swelled due to gas generation accompanied with decomposition of an electrolyte solution, and properties of the battery are deteriorated.

To solve such a problem, in a current lithium ion secondary battery, a separator including a porous substrate having fine pores such as a polypropylene or polyethylene film is interposed between a positive electrode and a negative electrode. When the temperature increases owing to the heat generated by short circuit, the separator including the porous substrate melts to block the pores. As a result, movement of ions is inhibited so that the current does not flow and runaway of the battery is suppressed.

Because of wider use of a lithium ion secondary battery, a battery having higher heat resistance, in particular, improved heat resistance at the time of internal short circuit has been currently required. When the internal short circuit occurs, the temperature increases to 600° C. or higher at the short circuit region owing to local heat generation. For this reason, in an existing separator including a porous substrate having fine pores such as a polyolefin film, the separator is shrunken or melted by heat generated by the short circuit at the short circuit region, and as a result, the battery is exposed to dangers of fuming, ignition, and explosion.

As a technology for preventing the short circuit caused by heat shrinkage or heat melting of a separator and improving reliability of a battery, a multilayer separator including a heat-resistant porous layer on one surface or both surfaces (i.e., front and back surfaces) of a porous substrate having fine pores such as a polyolefin film has been suggested.

Meanwhile, in the heat-resistant porous layer, an inorganic substance and a cyanoethyl group-containing polymer as a dispersant for evenly dispersing the inorganic substance are used, and sufficient stability of the separator of the battery may be secured when the dispersant maintains dispersibility at an appropriate level. When the dispersibility is poor, it is difficult to secure sufficient thermal stability of the separator because the inorganic substance is not evenly dispersed.

SUMMARY OF THE INVENTION

Technical Problem

In the present specification, there are provided a dispersant for a separator of a non-aqueous electrolyte battery, the dispersant capable of strongly adhering an inorganic filler upon forming a heat-resistant porous layer of the separator as well as further improving heat resistance of the separator by effectively dispersing the inorganic filler, a separator of a non-aqueous electrolyte battery using the same, and a non-aqueous electrolyte battery.

Technical Solution

In the present specification, there is provided a dispersant composition for a separator of a non-aqueous electrolyte battery, the dispersant composition including a cyanoethyl group-containing polymer including a first repeating unit represented by the following Chemical Formula 1, a second repeating unit represented by the following Chemical Formula 2, a third repeating unit represented by the following Chemical Formula 3, and a fourth repeating unit represented by the following Chemical Formula 4, wherein a ratio of the repeating number of the fourth repeating unit to the total repeating number of the first to fourth repeating units in the cyanoethyl group-containing polymer is 1:10000 or less:

[Chemical Formula 1]

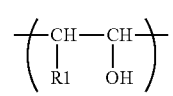

in Chemical Formula 1,
R1 is hydrogen or an alkyl group having 1 to 3 carbon atoms;

[Chemical Formula 2]

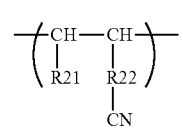

in Chemical Formula 2,
R21 is hydrogen or an alkyl group having 1 to 3 carbon atoms; and
R22 is an oxyethylene group,

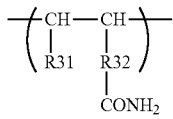
[Chemical Formula 3]

in Chemical Formula 3,
R31 is hydrogen or an alkyl group having 1 to 3 carbon atoms; and
R32 is an oxyethylene group,

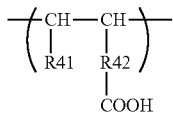
[Chemical Formula 4]

in Chemical Formula 4,
R41 is hydrogen or an alkyl group having 1 to 3 carbon atoms; and
R42 is an oxyethylene group.

In the cyanoethyl group-containing polymer, a ratio of the repeating number of the second repeating unit to the total repeating number of the first to fourth repeating units, i.e., a cyanoethyl substitution ratio may be about 0.70 or more and about 0.95 or less, the lower limit value thereof may be about 0.70 or more, or about 0.72 or more, or about 0.74 or more, and the upper limit value thereof may be about 0.95 or less, or about 0.9 or less, or about 0.87 or less.

Further, a ratio of the repeating number of the third repeating unit to the total repeating number of the first to fourth repeating units, i.e., an amidoethyl substitution ratio may be about 0.001 or more and about 0.070 or less, the lower limit value thereof may be about 0.001 or more, or about 0.003 or more, or about 0.010 or more, and the upper limit value thereof may be about 0.070 or less, or about 0.060 or less, or about 0.050 or less.

According to one embodiment of the present invention, R1, R21, R31, and R41 may be, each independently the same as or different from each other, hydrogen or methyl.

According to another embodiment of the present invention, a weight average molecular weight of the cyanoethyl group-containing polymer may be 100,000 to 500,000 g/mol, the lower limit thereof may be about 200,000 g/mol or more, or about 240,000 g/mol or more, and the upper limit thereof may be about 500,000 g/mol or less, or about 450,000 g/mol or less, or about 410,000 g/mol or less.

Meanwhile, according to another aspect of the present invention, there is provided a separator for a non-aqueous electrolyte battery, the separator including:
a heat-resistant porous layer including the above-described dispersant composition for a separator of a non-aqueous electrolyte battery; and
a porous substrate.

In this regard, the heat-resistant porous layer may further include an inorganic filler.

The inorganic filler may be selected from the group consisting of inorganic oxides, inorganic nitrides, poorly soluble ionic crystal particles, covalently bonded crystals, clay, materials derived from mineral resources, lithium titanium phosphate, and combinations thereof.

The porous substrate may be a substrate including one or more resins selected from the group consisting of polyolefin resins, polyester resins, polyacetal resins, polyamide resins, polycarbonate resins, polyimide resins, polyetheretherketone resins, polyethersulfone resins, and combinations thereof.

Meanwhile, according to still another aspect of the present invention, there is provided a non-aqueous electrolyte battery including a positive electrode, a negative electrode, the separator for a non-aqueous electrolyte battery, and an electrolyte solution.

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components, or combinations thereof beforehand.

In the present invention, when a layer or an element is mentioned to be formed "on" or "above" layers or elements, it means that each layer or element is directly formed on the layers or elements, or other layers or elements may be formed between the layers, subjects, or substrates.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, a dispersant for a separator of a non-aqueous electrolyte battery, a separator of a non-aqueous electrolyte battery using the same, and a non-aqueous electrolyte battery according to specific embodiments of the present invention will be described in more detail.

Dispersant Composition for Separator of Non-Aqueous Electrolyte Battery

According to an aspect of the present invention, provided is a dispersant composition for a separator of a non-aqueous electrolyte battery, the dispersant composition including a cyanoethyl group-containing polymer including a first repeating unit represented by the following Chemical Formula 1, a second repeating unit represented by the following Chemical Formula 2, a third repeating unit represented by the following Chemical Formula 3, and a fourth repeating unit represented by the following Chemical Formula 4, wherein a ratio of the repeating number of the fourth repeating unit to the total repeating number of the first to fourth repeating units in the cyanoethyl group-containing polymer is 1:10000 or less:

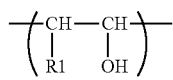
[Chemical Formula 1]

in Chemical Formula 1,
R1 is hydrogen or an alkyl group having 1 to 3 carbon atoms;

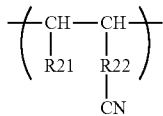
[Chemical Formula 2]

in Chemical Formula 2,
R21 is hydrogen or an alkyl group having 1 to 3 carbon atoms; and
R22 is an oxyethylene group,

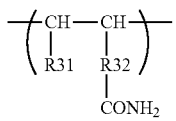
[Chemical Formula 3]

in Chemical Formula 3,
R31 is hydrogen or an alkyl group having 1 to 3 carbon atoms; and
R32 is an oxyethylene group,

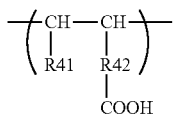
[Chemical Formula 4]

in Chemical Formula 4,
R41 is hydrogen or an alkyl group having 1 to 3 carbon atoms; and
R42 is an oxyethylene group.

As used herein, the oxyethylene represents —O—CH$_2$—CH$_2$—.

Through experiments, the present inventors have confirmed that, in a cyanoethyl group-containing polymer used as a dispersant of an inorganic filler in a heat-resistant porous layer of a separator of a non-aqueous electrolyte battery, when a ratio of respective repeating units constituting the polymer, i.e., a substitution ratio of an amidoethyl group or a substitution ratio of a carboxyethyl group, in addition to a substitution ratio of a cyanoethyl group, is controlled within a particular range, adhesion of the inorganic filler may be reinforced and dispersibility of the inorganic filler may also be increased, and as a result, heat resistance of the separator may be improved, thereby completing the present invention.

It is well known that in a separator of a non-aqueous electrolyte battery, the cyanoethyl group-containing polymer acts as a binder for firmly adhering the inorganic filler. However, adhesion of the inorganic filler or dispersibility of the inorganic filler according to the ratio of respective repeating units constituting the cyanoethyl group-containing polymer is not known in detail.

The cyanoethyl group-containing polymer according to an aspect of the present invention acts as a binder to firmly adhere the inorganic filler upon forming a heat-resistant porous layer of a separator, and also plays a role as a dispersant capable of effectively dispersing the inorganic filler. Therefore, it is possible to realize a separator having remarkably improved adhesion and heat resistance, as compared to the prior art.

According to one aspect of the present invention, provided is a dispersant composition for a separator of a non-aqueous electrolyte battery, the dispersant composition including a cyanoethyl group-containing polymer including a first repeating unit represented by the following Chemical Formula 1, a second repeating unit represented by the following Chemical Formula 2, a third repeating unit represented by the following Chemical Formula 3, and a fourth repeating unit represented by the following Chemical Formula 4, wherein a ratio of the repeating number of the fourth repeating unit to the total repeating number of the first to fourth repeating units in the cyanoethyl group-containing polymer is 1:10000 or less:

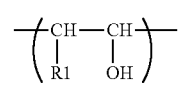
[Chemical Formula 1]

in Chemical Formula 1,
R1 is hydrogen or an alkyl group having 1 to 3 carbon atoms;

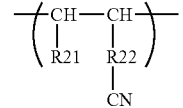
[Chemical Formula 2]

in Chemical Formula 2,
R21 is hydrogen or an alkyl group having 1 to 3 carbon atoms; and
R22 is an oxyethylene group,

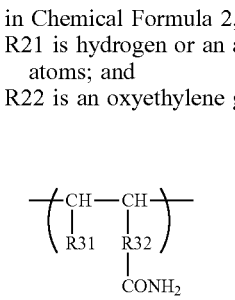
[Chemical Formula 3]

in Chemical Formula 3,
R31 is hydrogen or an alkyl group having 1 to 3 carbon atoms; and
R32 is an oxyethylene group,

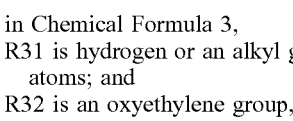
[Chemical Formula 4]

in Chemical Formula 4,
R41 is hydrogen or an alkyl group having 1 to 3 carbon atoms; and
R42 is an oxyethylene group.

The cyanoethyl group-containing polymer may be basically prepared by Michael addition reaction of acrylonitrile and a polymer having a hydroxyl group in the molecule, as represented by the following Reaction Scheme:

[Reaction Scheme]

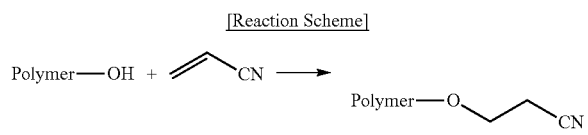

In Reaction Scheme, Polymer-OH represents a polymer having a hydroxyl group, and Polymer-O—$CH_2$—$CH_2$—CN represents a cyanoethyl group-containing polymer.

More specifically, the cyanoethyl group-containing polymer may be prepared by, for example, dissolving, in water, a polymer having a hydroxyl group in the molecule, adding a basic catalyst such as caustic soda, sodium carbonate, and/or quaternary ammonium hydroxide, and then allowing the reaction at about 0° C. to about 60° C. for about 2 hr to about 12 hr while continuously adding acrylonitrile.

In this regard, the polymer having a hydroxyl group in the molecule and acrylonitrile as the raw materials may be added simultaneously with the catalyst, or the polymer having a hydroxyl group in the molecule may be first added, and then the catalyst may be added thereto to create a reaction environment, followed by adding acrylonitrile.

The acrylonitrile may be added in an amount of about 1 part by weight to about 10 parts by weight, preferably, about 5 parts by weight to about 10 parts by weight with respect to about 1 part by weight of the polymer having a hydroxyl group.

However, the present invention is not necessarily limited thereto, and specific reaction conditions such as temperature, time, and content of reactants may vary in terms of controlling the substitution ratio of the cyanoethyl group.

In this regard, acrylonitrile may also serve as a solvent. If necessary, a diluted solvent that does not react with acrylonitrile, such as isopropyl alcohol, methyl ethyl ketone, acetone, etc., may be further added.

In addition, the substitution ratio of the cyanoethyl group may be controlled through the type or addition amount of the catalyst, pH of the reaction system, etc. For example, in the preparation process, an aqueous solution of the polymer having a hydroxyl group, such as polyvinyl alcohol, etc., is prepared, and an aqueous basic catalyst solution is first added and then acrylonitrile is added to improve the substitution ratio.

Meanwhile, the terminal cyano group (or nitrile group, —CN) of the cyanoethyl group introduced by the above reaction may be converted into an amide group by a hydrolysis reaction under acidic or basic catalytic conditions, and the amide group may also be converted into a carboxyl group by a hydrolysis reaction. Considering such a hydrolysis reaction, it is more preferable that the reaction for introducing the cyanoethyl group is performed under weak basic conditions, in which an ammonium-based catalyst such as quaternary ammonium hydroxide is used, in order to improve the adhesion and dispersibility of the cyanoethyl-containing polymer by controlling the substitution ratios of the amide group and the carboxyl group in an appropriate range.

Specifically, the quaternary ammonium hydroxide compound may include, for example, a quaternary ammonium hydroxide compound containing any one or more of an alkyl group having 1 to 5 carbon atoms and an aryl group having 6 to 10 carbon atoms, wherein it is more preferable that the number of carbon atoms of the alkyl group may be 1 to 4, and the aryl group may be a benzyl or phenyl group.

In this regard, the hydrolysis reaction may be allowed for about 1 hr to about 24 hr under a temperature condition of about 25° C. to about 60° C. and a pH condition of about 8 to about 11, and the hydrolysis reaction may be terminated by a method of adjusting pH by adding an acid.

For another example, such a cyanoethyl group-containing polymer may be prepared by Michael addition reaction of acrylonitrile, acrylamide, and a polymer having a hydroxyl group in the molecule, as represented by the following Reaction Scheme:

[Reaction Scheme]

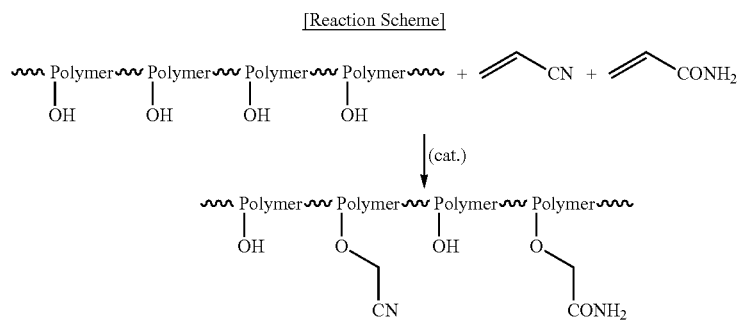

In the above reaction, the substitution ratios of the cyanoethyl group and the amidoethyl group may be differently controlled by varying the relative amounts of acrylonitrile and acrylamide.

More specifically, for example, the cyanoethyl group-containing polymer may be prepared by, for example, dissolving, in water, a polymer having a hydroxyl group in the molecule, adding a basic catalyst such as caustic soda, sodium carbonate, and/or quaternary ammonium hydroxide, continuously adding acrylonitrile and acrylamide, and allowing the reaction at about 0° C. to about 60° C. for about 2 to about 12 hr.

In this regard, the polymer having a hydroxyl group in the molecule, acrylonitrile, and acrylamide as the raw materials may be added simultaneously with the catalyst, or the polymer having a hydroxyl group in the molecule may be first added, and then the catalyst may be added thereto to create a reaction environment, followed by adding acrylonitrile and acrylamide.

The acrylonitrile may be added in an amount of about 1 part by weight to about 10 parts by weight, preferably, about 5 parts by weight to about 10 parts by weight with respect to about 1 part by weight of the polymer having a hydroxyl group.

The acrylamide may be added in an amount of about 0.5 parts by weight to about 5 parts by weight, preferably, about 1 part by weight to about 3 parts by weight with respect to about 1 part by weight of the polymer having a hydroxyl group.

However, the present invention is not necessarily limited thereto, and specific reaction conditions such as temperature, time, and content of reactants may vary in terms of controlling the substitution ratio.

In this regard, acrylonitrile and acrylamide may also serve as a solvent. If necessary, a diluted solvent that does not react with acrylonitrile and acrylamide, such as isopropyl alcohol, methyl ethyl ketone, acetone, etc., may be further added.

In addition, the substitution ratio of the cyanoethyl group and the substitution ratio of the amidoethyl group may be controlled through the type or addition amount of the catalyst, pH of the reaction system, etc. For example, in the preparation process, an aqueous solution of the polymer having a hydroxyl group, such as polyvinyl alcohol, etc., is prepared, and an aqueous basic catalyst solution is first added and then acrylonitrile and acrylamide are added at different times to improve the substitution ratios.

Meanwhile, changes in the substitution ratios of the cyanoethyl group, the amidoethyl group, or the carboxyethyl group according to the hydrolysis reaction of the terminal cyano group (or nitrile group, —CN) or the amide group are the same as described above.

In other words, the cyanoethyl group-containing polymer according to one embodiment of the present invention may be obtained by the reaction of the polymer containing a hydroxyl group with acrylonitrile as previously, or by the reaction of the polymer containing a hydroxyl group with acrylonitrile and acrylamide.

After the reaction is completed, the reaction solution is separated into two layers of an aqueous layer and an organic layer including the cyanoethyl group-containing polymer. The organic layer is taken out and water is added thereto to precipitate the product, thereby obtaining a crude product of the cyanoethyl group-containing polymer. This crude product is washed with a large amount of water, or re-dissolution/re-precipitation is repeated to obtain the cyanoethyl group-containing polymer, in which the content of a bis-cyanoethyl ether as a by-product is 0.5% by weight or less.

The polymer having a hydroxyl group, which is used as a raw material in the above-described preparation process, may be used without particular limitation as long as the Michael addition reaction with acrylonitrile is possible, and specifically, it may include, for example, saccharides such as pullulan, cellulose, dihydroxypropyl pullulan, hydroxyethyl cellulose, hydroxypropyl cellulose, starch, etc., or polyvinyl alcohol, and preferably, polyvinyl alcohol.

Among them, polyvinyl alcohol is able to strongly adhere the inorganic fillers with each other and also has flexibility, and therefore, it is possible to prevent defects, such as cracking, etc., from occurring when a separator is bent or folded.

In the cyanoethyl group-containing polymer according to one aspect of the present invention, the first repeating unit represented by Chemical Formula 1 may represent a portion in which the hydroxyl group remains as it is due to no substitution of the cyanoethyl group in the polymer having a hydroxyl group, i.e., Polymer-OH, in the above Reaction Scheme.

In the cyanoethyl group-containing polymer, the second repeating unit represented by Chemical Formula 2 may represent a portion in which the cyanoethyl group is introduced due to substitution of the cyanoethyl group in the polymer having a hydroxyl group, i.e., Polymer-OH, in the above Reaction Scheme.

In the cyanoethyl group-containing polymer, the third repeating unit represented by Chemical Formula 3 may represent a portion in which the amide group is introduced due to substitution of the amidoethyl group or the introduced cyanoethyl group is converted to the amide group by hydrolysis in the polymer having a hydroxyl group, i.e., Polymer-OH, in the above Reaction Scheme.

In the cyanoethyl group-containing polymer, the fourth repeating unit represented by Chemical Formula 4 may represent a portion in which the introduced cyanoethyl or amidoethyl group is converted to the carboxyl group by hydrolysis in the polymer having a hydroxyl group, i.e., Polymer-OH, in the above Reaction Scheme.

The cyanoethyl group-containing polymer used in a separator of a non-aqueous electrolyte battery according to an aspect of the present invention may include, as described above, all of the first repeating unit in which the hydroxyl group remains without substitution, the second repeating unit in which the cyanoethyl group is introduced, and the third repeating unit in which the amidoethyl group is introduced, wherein the carboxyethyl group-introduced fourth repeating unit may be included at a ratio of about 1:10000 or less, or about 1:100000 or less with respect to the total repeating number of the first to fourth repeating units, or may not be substantially included.

As used herein, "not substantially included" means that even though a very small amount of the carboxyethyl group may be introduced by hydrolysis of the cyanoethyl group or the amidoethyl group, it is not actually detectable due to the detection limit of a detection device.

The cyanoethyl group-containing polymer according to an aspect of the present invention may include all of the first, second, and third repeating units at the same time while not substantially including the fourth repeating unit, and therefore, it may firmly adhere the inorganic filler upon forming a heat-resistant porous layer of a separator of a non-aqueous electrolyte battery, and also may improve dispersibility of the inorganic filler, thereby greatly improving heat resistance.

In particular, when the third repeating unit, i.e., the amidoethyl group is introduced, it is thought that the inorganic filler may be effectively dispersed by the interaction such as hydrogen bonding with the inorganic filler. In order to realize this effect, when the substitution ratio of the amidoethyl group is controlled to a specific range, the substitution ratio of the carboxyethyl group generated by hydrolysis thereof is also naturally increased, and therefore, there is a problem in that adhesion and dispersibility are lowered.

However, since the cyanoethyl group-containing polymer according to one exemplary embodiment of the present invention uses quaternary ammonium hydroxide as a catalyst as described above in the polymerization or the treatment process after the polymerization, the hydrolysis reaction of converting the amidoethyl group to the carboxyethyl group may be effectively suppressed, and accordingly, the substitution ratio of the amidoethyl group may be controlled to a specific range, and at the same time, the substitution ratio of the carboxyethyl group may be controlled to about 1:10000 or less, or about 1:100000 or less, or introduction of the carboxyethyl group may be substantially prevented.

In this regard, in the cyanoethyl group-containing polymer, a ratio of the repeating number of the second repeating unit to the total repeating number of the first to fourth repeating units, i.e., a cyanoethyl substitution ratio may be about 0.70 or more and about 0.95 or less, the lower limit value thereof may be about 0.70 or more, or about 0.72 or more, or about 0.74 or more, and the upper limit value thereof may be about 0.95 or less, or about 0.9 or less, or about 0.87 or less.

The above-described ratio of the repeating number of the second repeating unit, which is a ratio of the repeating number of the cyanoethyl group introduced into the hydroxyl group of Polymer-OH in the above Reaction Scheme, may refer to a substitution ratio of the cyanoethyl group of the cyanoethyl group-containing polymer. When this is summarized in the unit of mole %, the cyanoethyl group-containing polymer according to one exemplary embodiment of the present invention may be a cyanoethyl group-introduced polymer, in which the substitution ratio may be about 70 mol % or more and about 95 mol % or less, the lower limit value thereof may be about 70 mol % or more, or about 72 mol % or more, or about 74 mol % or more, and the upper limit value thereof may be about 95 mol % or less, or about 90 mol % or less, or about 87 mol % or less.

In the cyanoethyl group-containing polymer, a ratio of the repeating number of the third repeating unit to the total repeating number of the first to fourth repeating units, i.e., an amidoethyl substitution ratio may be about 0.001 or more and about 0.070 or less, the lower limit value thereof may be about 0.001 or more, or about 0.003 or more, or about 0.010 or more, and the upper limit value thereof may be about 0.070 or less, or about 0.060 or less, or about 0.050 or less.

The above-described ratio of the repeating number of the third repeating unit, which is a ratio of the repeating number of the amide group introduced by amidation after introduction of the cyanoethyl group into the hydroxyl group of Polymer-OH in the above Reaction Scheme, may refer to a substitution ratio of the amidoethyl group of the cyanoethyl group-containing polymer. When this is summarized in the unit of mole %, the cyanoethyl group-containing polymer according to one exemplary embodiment of the present invention may be an amidoethyl group-introduced polymer, in which the substitution ratio may be about 0.1 mol % or more about 7.0 mol % or less, the lower limit value thereof may be about 0.1 mol % or more, or about 0.3 mol % or more, or about 1.0 mol % or more, and the upper limit value thereof may be about 7.0 mol % or less, or about 6.0 mol % or less, or about 5.0 mol % or less.

The cyanoethyl group-containing polymer having the substitution ratio of the cyanoethyl group in the above range may improve adhesion of the inorganic filler while effectively dispersing the inorganic filler.

Here, the substitution ratio of the cyanoethyl group and the substitution ratio of the amidoethyl group may be calculated based on the nitrogen content in the cyanoethyl group-containing polymer as measured by the Kjeldahl method or may be derived by measuring NMR data of a sample and then calculating the peak area.

Further, a weight average molecular weight of the cyanoethyl group-containing polymer may be about 100,000 g/mol to about 500,000 g/mol. Due to a combination of the factors such as the substitution ratio of the above range, and the molecular weight of the polymer, adhesion of the inorganic filler may be improved and the inorganic filler may also be effectively dispersed.

In this regard, the weight average molecular weight may be measured by gel permeation chromatography (GPC) using polystyrene standards.

Meanwhile, the composition used to form a heat-resistant porous layer in a separator of a non-aqueous electrolyte battery may include the above-described cyanoethyl group-containing polymer, and if necessary, a resin such as ethylene-vinyl acetate copolymer (EVA, containing 20 mol % to 35 mol % of repeating unit derived from vinyl acetate), acrylate copolymer, styrene butadiene rubber (SBR), polyvinyl butyral (PVB), polyvinyl pyrrolidone (PVP), polyurethane, poly(vinylidene fluoride-hexafluoropropylene) copolymer, poly(vinylidene fluoride-trichloroethylene) copolymer, poly(vinylidene fluoride-chlorotrifluoroethylene) copolymer, poly(vinylidene fluoride-hexafluoropropylene) copolymer, poly(vinylidene fluoride-trichloroethylene) copolymer, cellulose acetate, cellulose acetate butyrate, cellulose acetate propionate, etc.

When these resins are further used, the resin may be mixed in an amount of about 10 parts by weight to about 1,000 parts by weight with respect to 100 pars by weight of the cyanoethyl group-containing polymer.

Separator for Non-Aqueous Electrolyte Battery

Meanwhile, according to an aspect of the present invention, a separator of a non-aqueous electrolyte battery may include a heat-resistant porous layer including the above-described dispersant composition for a separator of a non-aqueous electrolyte battery, and a porous substrate.

The heat-resistant porous layer may further include an inorganic filler.

Specifically, the separator of a non-aqueous electrolyte battery of the present invention may be a separator including a heat-resistant porous layer including the dispersant composition and an inorganic filler, and a porous substrate, wherein the heat-resistant porous layer may be formed on one surface or both surfaces of the porous substrate, and the inside of the heat-resistant porous layer may have many pores resulting from the voids present among inorganic fillers.

When the heat-resistant porous layer is formed on one surface of the porous substrate, the heat resistant-porous layer may be formed on either a positive electrode side or a negative electrode side.

Meanwhile, the inorganic filler is not particularly limited, as long as it has a melting point of 200° C. or higher, a high electric insulation, electrochemical stability, and stability in an electrolyte solution or a solvent used for slurry for forming the heat-resistant porous layer.

Examples of the inorganic filler may include, for example, particles of inorganic oxides such as iron oxide, $SiO_2$ (silica), $Al_2O_3$ (alumina), $TiO_2$, $BaTiO_3$, $ZrO$, $PB(Mg_{3}Nb_{2/3})O_3$—$PbTiO_3$(PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, etc.; particles of inorganic nitrides such as aluminum nitride, silicon nitride, etc.; particles of poorly soluble ionic crystals such as calcium fluoride, barium fluoride, barium sulfate, etc.; particles of covalent crystals such as silicone, diamond, etc.; particles of clay such as talc, montmorillonite, etc.; a material derived from a mineral such as boehmite, zeolite, apatite, kaolin, mullite, spinel, olivine, sericite, bentonite, etc., or lithium titanium phosphate ($Li_xTi_y(PO_4)_3$, wherein x and y are numbers satisfying $0<x<2$ and $0<y<3$, respectively); and any combination thereof.

The particle diameter of the inorganic filler is not particularly limited. The inorganic filler having the mean particle diameter of about 5 nm to about 5 μm, and preferably, about 0.01 μm to about 1 μm may be used in view of forming a heat-resistant porous layer having a uniform thickness and obtaining an appropriate void ratio.

Here, the mean particle diameter may be measured by a device based on a laser diffraction scattering method.

When the particle diameter of the inorganic filler is too small, there is a problem in that dispersibility is lowered and thus it may be difficult to control the physical properties of the separator.

When the particle diameter of the inorganic filler is too large, there is a problem in that strength of the heat-resistant porous layer is lowered and smoothness of the surface tends to get deteriorated. In addition, the heat-resistant porous layer becomes thicker, and thus it is apprehended that the mechanical properties are lowered.

Meanwhile, a method of forming the heat-resistant porous layer is not particularly limited. For example, the heat-resistant porous layer may be formed by coating the porous substrate with a slurry in which the inorganic filler has been dispersed in the dispersant composition, and drying for removing the solvent.

Here, the solvent used in the dispersant composition is not particularly limited as long as the above-described cyanoethyl group-containing polymer is dissolved therein. Examples of the solvent may include acetone, tetrahydrofuran, cyclohexanone, ethylene glycol monomethyl ether, methyl ethyl ketone, acetonitrile, furfuryl alcohol, tetrahydrofurfuryl alcohol, methyl acetoacetate, nitromethane, N,N-dimethylformamide (DMF), N-methyl-2-pyrrolidone, γ-butyrolactone, propylene carbonate, etc.

The solvent may be used in an amount of about 300 parts by weight to about 5,000 parts by weight with respect to 100 parts by weight of the cyanoethyl group-containing polymer and the resin.

As for the method of dispersing the inorganic filler in the above-described dispersant composition, a known method of using a stirrer, a disperser, a pulverizer, etc. may be employed. In particular, a ball mill method may be used.

A relative content ratio between the dispersant composition and the inorganic filler in slurry is not particularly limited, but it may be controlled according to the thickness, the average pore diameter, and porosity of the heat-resistant porous layer to be prepared.

Specifically, the content of the inorganic filler in the heat-resistant porous layer may be about 50% by weight or more, or about 95% by weight or less.

When the content of the inorganic filler is too low, there is problem in that a pore portion in the heat-resistant porous layer becomes small and thus the battery performance may be deteriorated or sufficient heat resistance may not be obtained. When the content of the inorganic filler is too high, there is problem in that the heat resistant-porous layer may become brittle and thus it may be difficult to handle.

Meanwhile, the heat-resistant porous layer may have low resistance because the pores ensure a route for ionic conduction. The average pore diameter is not particularly limited as long as they are large enough for the lithium ions contained in an electrolyte solution described below to pass through. The average pore diameter may be about 5 nm to about 5 μm, and preferably, about 0.1 μm to about 3 μm from the viewpoint of mechanical strength of the heat-resistant porous layer. The porosity may be in the range of about 5% to about 95%, and preferably, about 20% to about 70%.

Here, the average pore diameter may be measured by using a mercury intrusion porosimeter. The porosity may be calculated based on the following Equation, after obtaining true density (d) of the inorganic filler, volume (v) of the heat-resistant porous layer, and weight (m) of the heat-resistant porous layer.

$$\text{Porosity (\%)} = \{1 - m/(vd)\} \times 100$$

The heat-resistant porous layer having an average pore diameter and a porosity in the above range may be obtained by controlling the particle diameter or the content of the inorganic filler, as described above.

Meanwhile, the porous substrate may include a thermoplastic resin component.

The thermoplastic resin component may melt to close the pores in the porous substrate and block ion movement and thus an electric current may stop and excess heat or ignition may be suppressed, when the temperature becomes higher than a certain limit.

The thermoplastic resin used as the porous substrate may include polyolefin resins such as low density polyethylene, high density polyethylene, ultra high molecular weight polyethylene, polypropylene, etc.; polyester resins such as polyethylene terephthalate, polybutylene terephthalate, etc.; polyacetal resins; polyamide resins; polycarbonate resins; polyimide resins; polyether ether ketone resins; polyether sulfone resins; and any combination thereof.

Meanwhile, the porous substrate may be preferably a film. Although the thickness thereof is not particularly limited, it is preferably about 2 μm to about 50 μm. When the thickness is too thin, there is a problem in that the mechanical properties may not be maintained. When the thickness is too thick, there is a problem in that it may function as a resistant layer.

Although the average pore diameter and the porosity of the porous substrate are not particularly limited, the average pore diameter may be preferably about 0.1 μm to about 30 μm and the porosity may be preferably about 10% to about 90%.

When the pore size is too small or the porosity is too low, there is a problem in that the ion conductivity may deteriorate, and when the average pore diameter is too large or the porosity is too high, there is a problem in that mechanical strength may deteriorate, and thus the substrate may not function as a substrate.

The average pore diameter may be measured in the same manner as that for the heat-resistant porous layer. Meanwhile, the porosity may be calculated based on the following Equation, after obtaining true density (d) of the porous substrate, volume (v) of the porous substrate, and weight (m) of the porous substrate.

$$\text{Porosity (\%)} = \{1 - m/(vd)\} \times 100$$

Meanwhile, a method of coating the porous substrate with the slurry may include a coating method commonly used in the art, and is not particularly limited as long as a desirable film thickness or a coating area may be achieved. Examples of the method may include a gravure coater method, a reverse roll coater method, a transfer roll coater method, a kiss coater method, a dipping coater method, a knife coater method, an air doctor coater method, a blade coater method, a rod coater method, a squeeze coater method, a cast coater method, a die coater method, a screen printing method, a spray coating method, etc.

The total thickness of the separator thus obtained of a non-aqueous electrolyte battery is not particularly limited and may be adjusted in consideration of application and performance of the battery. It may be preferably in the range of about 2 μm to about 55 μm from the viewpoint of ensuring separation between a positive electrode and a negative electrode.

Non-Aqueous Electrolyte Battery

Meanwhile, the non-aqueous electrolyte battery according to an aspect of the present invention may include a positive electrode, a negative electrode, the above-described separator of a non-aqueous electrolyte battery, and an electrolyte solution.

Specifically, the separator of a non-aqueous electrolyte battery is placed between the positive electrode and the negative electrode, and immersed in an electrolyte solution to produce a non-aqueous electrolyte battery.

When the separator of a non-aqueous electrolyte battery, including the heat-resistant porous layer formed on one surface of the porous substrate, is used, the separator may be placed in such a manner that the surface of the heat-resistant porous layer faces any side of the positive electrode and negative electrode.

The non-aqueous electrolyte battery of the present invention may include, for example, a lithium secondary battery such as a lithium metal secondary battery, a lithium ion secondary battery, a lithium polymer secondary battery, a lithium ion polymer secondary battery, etc.

Meanwhile, the positive electrode and the negative electrode may be generally manufactured by coating an electrode current collector with an electrode mix prepared by dispersing a positive electrode or negative electrode active material and a conductive aid in a binder solution.

The positive electrode active material may include a lithium-containing transition metal oxide having a layer structure, represented by Chemical Formula of $Li_{1+x}MO_2$ (−0.1<x<0.1, M: Co, Ni, Mn, Al, Mg, Zr, Ti, Sn, etc.); a lithium manganese oxide having a spinel structure such as $LiMn_2O_4$ or a composition having part thereof substituted with one or more of the other elements; and an olivine type compound represented by $LiMPO_4$(M: Co, Ni, Mn, Fe, etc.).

The lithium-containing transition metal oxide having a layer structure may include, for example, $LiCoO_2$, $LiNi_{1-x}Co_{x-y}Al_yO_2$ (0.1≤x≤0.3, 0.01≤y≤0.2), and an oxide containing at least Co, Ni, and Mn ($LiMn_{1/3}Ni_{1/3}Co_{1/3}O_2$, $LiMn_{5/12}Ni_{5/12}Co_{1/6}O_2$, $LiNi_{3/5}Mn_{1/5}Co_{1/5}O_2$, etc.).

The negative electrode active material may include, for example, a lithium metal, a lithium alloy such as lithium aluminum alloy, etc., a carbonaceous material capable of storing and releasing lithium, graphite, cokes such as a phenol resin, a furan resin, etc., carbon fibers, glass-like carbon, pyrolytic carbon, active carbon, etc.

Meanwhile, the positive electrode current collector may include, for example, a thin metal foil made of aluminum, nickel, or a combination thereof. The negative electrode current collector may include, for example, a thin metal foil made of copper, gold, nickel, copper alloy, or a combination thereof.

Meanwhile, the conductive aid may include, for example, carbon black such as acetylene black, ketjen black, etc.; metal fibers such as aluminum, nickel, etc.; natural graphite, heat-expanding graphite, carbon fibers, ruthenium oxide, titanium oxide, etc. Among them, acetylene black or ketjen black may be preferably used, as it may provide desired conductivity with addition of a small amount thereof.

Meanwhile, the binder may include various known binders. Examples thereof may include polytetrafluoroethylene, polyvinylidene fluoride, carboxymethyl cellulose, a cross-linked polymer of fluoroolefin copolymers, styrene-butadiene copolymer, polyacrylonitrile, polyvinyl alcohol, etc.

The binder may include those dissolved in a solvent. Examples of the solvent may include N-methyl-2-pyrrolidone (NMP).

As for the electrolyte solution, a solution in which a lithium salt is dissolved in an organic solvent may be used. The lithium salt is not particularly limited as long as it dissociates in a solvent to form $Li^+$ ion and does not easily cause a side reaction such as decomposition within the voltage range in which the battery is used.

For example, an inorganic lithium salt such as $LiClO_4$, $LiPF_6$, $LiBF_4$, $LiAsF_6$, $LiSbF_6$, etc., and an organolithium salt such as $LiCF_3SO_3$, $LiCF_3CO_2$, $Li_2C_2F_4(SO_3)_2$, $LiN(CF_3SO_2)_2$, $LiC(CF_3SO_2)_3$, $LiCnF_{2n+1}SO_3$ (n≥2), $LiN(RfOSO_2)_2$, etc. (wherein Rf represents a fluoroalkyl group) may be used. Preferred examples of the lithium salt may include $LiPF_6$, $LiClO_4$, $LiAsF_6$, $LiBF_4$, $LiCF_3SO_3$, and $Li(CF_3SO_2)_2N$.

Meanwhile, the organic solvent used for the electrolyte solution is not particularly limited as long as it may dissolve the lithium salt and does not cause a side reaction such as decomposition within the voltage range in which the battery is used. For example, cyclic carbonate esters such as propylene carbonate, ethylene carbonate, etc., chain carbonate esters such as ethyl methyl carbonate, diethyl carbonate, dimethyl carbonate, dipropyl carbonate, etc., or a mixture thereof may be exemplified, but are not limited thereto.

When a mixture of the cyclic carbonate ester and the chain carbonate ester is used, a volume ratio of the cyclic carbonate ester to the chain carbonate ester is preferably about 4:1 to about 1:4 from the viewpoint of optimizing the permittivity and viscosity.

Meanwhile, a shape of the non-aqueous electrolyte battery of the present invention may include a prism type or a cylindrical type, in which a steel can or an aluminum can is used as a casing (i.e., can casing). Further, it may be a package battery, in which a metal-deposited laminate film is used as a casing, but is not particularly limited thereto.

Advantageous Effects

A separator composition for a non-aqueous electrolyte battery of the present invention may strongly adhere an inorganic filler upon forming a heat-resistant porous layer of a separator, and may also further improve heat resistance of the separator by effectively dispersing the inorganic filler.

DETAILED DESCRIPTION OF THE EMBODIMENTS

Hereinafter, the actions and effects of the present invention will be described in more detail with reference to the specific exemplary embodiments of the present invention. However, these exemplary embodiments are for illustrative purposes only, and the scope of the present invention is not intended to be limited thereby.

A cyanoethyl substitution ratio was determined as the ratio (%) to mole number of hydroxyl groups originally existing per a repeating unit of a polymer, after calculating the nitrogen content in cyanoethylated polyvinyl alcohol produced in the following Synthesis Example by the Kjeldahl method.

An amidoethyl substitution ratio was determined by calculating the peak area corresponding to hydrogens bound to a nitrogen atom after obtaining $H^1$-NMR spectrum of a sample.

A carboxyethyl substitution ratio was determined by calculating the peak area corresponding to a carboxyl group (—COO—) after obtaining IR spectrum of a sample.

A weight average molecular weight was analyzed by GPC, and GPC measurement conditions are as follows:

Apparatus: Gel permeation chromatography GPC (apparatus name: Alliance e2695; manufacturer: WATERS)
Detector: Differential refractive index detector (apparatus name: W2414; manufacturer: WATERS)
Column: DMF column
Flow rate: 1 mL/min
Column temperature: 65° C.
Injection amount: 0.100 mL
Standard sample: polystyrene An average particle diameter of the slurry was measured using a particle size analyzer (Mastersizer, Malvern).

A sedimentation rate of the slurry was measured using a LUMiSizer equipment.

EXAMPLE

Preparation of Polymer Using Acrylamide Monomer

Example 1-1

1 part by weight of polyvinyl alcohol (PVA), 6 parts by weight of acrylonitrile (AN), 2 parts by weight of acrylamide, and 1.32 parts by weight of benzyltrimethylammonium hydroxide (3.83 wt % aqueous solution) as a catalyst were introduced into a reactor equipped with a stirrer, and allowed to react at 50° C. for 90 min.

3 parts by weight of acetone and 0.3 parts by weight of water were added thereto, and stirred for 40 min, and then 0.088 parts by weight of acetic acid (25 wt % aqueous solution) was introduced to terminate the reaction, thereby obtaining polyvinyl alcohol, into which a cyanoethyl group and an amidoethyl group were introduced.

A substitution ratio of the cyanoethyl group was 75.3 mol %, a substitution ratio of the amidoethyl group was 4.2 mol %, and a peak corresponding to the carboxyl group was not observed in IR spectrum (Mw: 390,000).

Example 1-2

1 part by weight of polyvinyl alcohol (PVA), 6 parts by weight of acrylonitrile (AN), 2 parts by weight of acrylamide, and 1.32 parts by weight of benzyltrimethylammonium hydroxide (5.5 wt % aqueous solution) as a catalyst were introduced into a reactor equipped with a stirrer, and allowed to react at 50° C. for 90 min.

3 parts by weight of acetone and 0.3 parts by weight of water were added thereto, and stirred for 40 min, and then 0.088 parts by weight of acetic acid (25 wt % aqueous solution) was introduced to terminate the reaction, thereby obtaining polyvinyl alcohol, into which a cyanoethyl group and an amidoethyl group were introduced.

A substitution ratio of the cyanoethyl group was 76.2 mol %, a substitution ratio of the amidoethyl group was 3.1 mol %, and a peak corresponding to the carboxyl group was not observed in IR spectrum (Mw: 362,000).

Example 1-3

1 part by weight of polyvinyl alcohol (PVA), 6 parts by weight of acrylonitrile (AN), 2 parts by weight of acrylamide, and 1.32 parts by weight of benzyltrimethylammonium hydroxide (6.49 wt % aqueous solution) as a catalyst were introduced into a reactor equipped with a stirrer, and allowed to react at 50° C. for 90 min.

3 parts by weight of acetone and 0.3 parts by weight of water were added thereto, and stirred for 40 min, and then 0.088 parts by weight of acetic acid (25 wt % aqueous solution) was introduced to terminate the reaction, thereby obtaining polyvinyl alcohol, into which a cyanoethyl group and an amidoethyl group were introduced.

A substitution ratio of the cyanoethyl group was 74.5 mol %, a substitution ratio of the amidoethyl group was 3.5 mol %, and a peak corresponding to the carboxyl group was not observed in IR spectrum (Mw: 402,000).

Example 1-4

1 part by weight of polyvinyl alcohol (PVA), 6 parts by weight of acrylonitrile (AN), 3 parts by weight of acrylamide, and 1.32 parts by weight of benzyltrimethylammonium hydroxide (3.83 wt % aqueous solution) as a catalyst were introduced into a reactor equipped with a stirrer, and allowed to react at 50° C. for 90 min.

3 parts by weight of acetone and 0.3 parts by weight of water were added thereto, and stirred for 40 min, and then 0.088 parts by weight of acetic acid (25 wt % aqueous solution) was introduced to terminate the reaction, thereby obtaining polyvinyl alcohol, into which a cyanoethyl group and an amidoethyl group were introduced.

A substitution ratio of the cyanoethyl group was 74.3 mol %, a substitution ratio of the amidoethyl group was 5.0 mol %, and a peak corresponding to the carboxyl group was not observed in IR spectrum (Mw: 399,000).

Characteristics of the cyanoethyl group-containing polymers prepared in Examples 1 to 4 are summarized in Table 1 below.

TABLE 1

| | Cyanoethyl substitution ratio (mol %) | Amide substitution ratio (mol %) | Carboxyl substitution ratio (mol %) |
| --- | --- | --- | --- |
| Example 1-1 | 75.3 | 4.2 | 0 (Not detected) |
| Example 1-2 | 76.2 | 3.1 | 0 (Not detected) |
| Example 1-3 | 74.5 | 3.5 | 0 (Not detected) |
| Example 1-4 | 74.3 | 5.0 | 0 (Not detected) |

Preparation of Polymer Left for Predetermined Time after Michael Reaction
Preparation of Polymer 30 g of polyvinyl alcohol (PVA) and 135 g of acrylonitrile (AN) were introduced into a reactor equipped with a stirrer, and maintained at 50° C.

Primarily, 6.6 g of benzyltrimethylammonium hydroxide (4.18 wt % aqueous solution) was introduced thereto, and maintained for 50 min.

Secondarily, 33.3 g of benzyltrimethylammonium hydroxide (4.18 wt % aqueous solution) was introduced thereto, and maintained for 50 min.

72 g of acetone and 9 g of water were added thereto, and allowed to react for 10 hr while collecting product samples according to the reaction time.

The product samples thus obtained were confirmed to have a weight average molecular weight of about 250,000 g/mol.

The results are summarized in Table 2 below, and the time summarized in the following Table is based on the time point when water and acetone were introduced.

As Comparative Example, cyanoethylated polyvinyl alcohol having a weight average molecular weight of about 250,000 g/mol, a cyanoethyl substitution ratio of about 83 mol %, and an amide substitution ratio of 0 mol % was prepared.

TABLE 2

|  | Hour(s) | Cyanoethyl substitution ratio (mol %) | Amide substitution ratio (mol %) | Carboxyl substitution ratio (mol %) |
|---|---|---|---|---|
| Example 2-1 | 0 | 84.9 | 0.31 | 0 (Not detected) |
| Example 2-2 | 1 | 86.7 | 0.77 | 0 (Not detected) |
| Example 2-3 | 3 | 82.3 | 1.43 | 0 (Not detected) |
| Example 2-4 | 5 | 80.3 | 2.08 | 0 (Not detected) |
| Example 2-5 | 6 | 79.8 | 2.27 | 0 (Not detected) |
| Example 2-6 | 8 | 75.9 | 2.68 | 0 (Not detected) |
| Example 2-7 | 10 | 76.4 | 2.61 | 0 (Not detected) |
| Example 2-8 | 12 | 81.4 | 3.81 | 0 (Not detected) |
| Comparative Example 1 | — | 83.0 | 0 | 0 (Not detected) |

Preparation of Slurry

To 320 parts by weight of acetone, 1 part by weight of each polyvinyl alcohol-based polymer obtained in Examples and Comparative Example, and 7 parts by weight of polyvinylidene fluoride-hexafluoropropylene as a binder were added, and dissolved at 50° C. for 12 hr. 72 parts by weight of Al$_2$O$_3$ having a number average diameter of 500 nm as inorganic particles was added thereto, and each slurry was prepared using a ball mill method. Particle diameter characteristics and sedimentation rates of the slurries were measured.

Measurement of Particle Diameter Characteristic

A particle diameter of each slurry composition prepared above was measured using a particle size analyzer.

Measurement of Sedimentation Rate

To examine dispersibility of the binder, the slurries prepared in Examples and Comparative Example were rotated at 1,000 rpm using a dispersion stability analyzer (LUMiSizer), and the sedimentation rate of alumina was measured at 25° C., and the results are shown in Table 3 below. For reference, as the dispersibility of the cyanoethyl group-containing polymer is better, alumina is dispersed well and its sedimentation is slow.

The measurement results are summarized in Table 3 below.

Manufacture of Electrode for Adhesion Test

Artificial graphite, carbon black, CMC, and a binder were mixed with water at a weight ratio of 96:1:1:2 to prepare a negative electrode slurry. The negative electrode slurry was coated on a copper foil having a thickness of 50 μm, dried at 80° C. for 1 hr or longer, and then pressed to manufacture a negative electrode.

The cyanoethyl group-containing polymer prepared above and the slurry of inorganic particles were applied to one side of a polyethylene porous substrate using a doctor blade and dried to prepare a separator having a porous coating layer.

The negative electrode and the separator were put in a lamination equipment to be laminated with each other, and this sample was peeled at a speed of 100 mm/min using a UTM equipment, and the force required to peel the adhesion surface between the electrode and the separator was measured.

The measurement results are summarized in Table 3 below.

TABLE 3

|  | Sedimentation rate (based on 1000 rpm) | Electrode adhesion (gf/15 mm) |
|---|---|---|
| Example 1-1 | 9.0 | 96 |
| Example 1-2 | 9.3 | 94 |
| Example 1-3 | 9.3 | 93 |
| Example 1-4 | 8.8 | 101 |
| Example 2-1 | 12.0 | 78 |
| Example 2-2 | 11.7 | 80 |
| Example 2-3 | 10.0 | 82 |
| Example 2-4 | 9.8 | 88 |
| Example 2-5 | 9.5 | 90 |
| Example 2-6 | 9.4 | 92 |
| Example 2-7 | 9.4 | 92 |
| Example 2-8 | 9.2 | 95 |
| Comparative Example 1 | 12.7 | 76 |

Referring to the above table, the slurries prepared by using the cyanoethyl group-containing polymer according to one exemplary embodiment of the present invention had superior dispersibility, as compared with that of Comparative Example, and therefore, they were able to well disperse alumina, and accordingly, sedimentation thereof was slower than that of Comparative Example.

In addition, it was clearly confirmed that the separators manufactured using the cyanoethyl group-containing polymer showed very excellent adhesion between the electrode and the separator. In particular, it was clearly confirmed that Example 1-4 realized the adhesive strength 30% higher than that of Comparative Example.

What is claimed is:

1. A dispersant composition for a separator of a non-aqueous electrolyte battery, the dispersant composition comprising a cyanoethyl group-containing polymer including a first repeating unit represented by Chemical Formula 1, a second repeating unit represented by Chemical Formula 2, a third repeating unit represented by Chemical Formula 3, and a fourth repeating unit represented by Chemical Formula 4, wherein a ratio of the repeating number of the fourth repeating unit to the total repeating number of the first to fourth repeating units in the cyanoethyl group-containing polymer is 1:10000 or less, and a ratio of the repeating number of the third repeating unit to the total repeating number of the first to fourth repeating units is 0.001 or more and 0.070 or less:

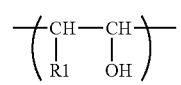

[Chemical Formula 1]

in Chemical Formula 1,
R1 is hydrogen or an alkyl group having 1 to 3 carbon atoms,

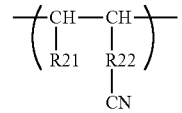

[Chemical Formula 2]

in Chemical Formula 2,
R21 is hydrogen or an alkyl group having 1 to 3 carbon atoms; and
R22 is an oxyethylene group,

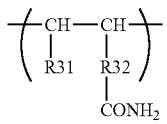
[Chemical Formula 3]

in Chemical Formula 3,
R31 is hydrogen or an alkyl group having 1 to 3 carbon atoms; and
R32 is an oxyethylene group,

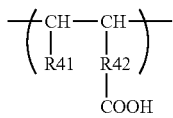
[Chemical Formula 4]

in Chemical Formula 4,
R41 is hydrogen or an alkyl group having 1 to 3 carbon atoms; and
R42 is an oxyethylene group.

2. The dispersant composition for a separator of a non-aqueous electrolyte battery according to claim 1, wherein a ratio of the repeating number of the second repeating unit to the total repeating number of the first to fourth repeating units in the cyanoethyl group-containing polymer is 0.70 or more and 0.95 or less.

3. The dispersant composition for a separator of a non-aqueous electrolyte battery according to claim 1, wherein R1, R21, R31, and R41 are the same as or different from each other, each independently hydrogen or methyl.

4. The dispersant composition for a separator of a non-aqueous electrolyte battery according to claim 1, wherein a weight average molecular weight of the cyanoethyl group-containing polymer is 100,000 g/mol to 500,000 g/mol.

5. A separator of a non-aqueous electrolyte battery, the separator comprising:
a heat resistant porous layer including the dispersant composition for a separator of a non-aqueous electrolyte battery according to claim 1; and
a porous substrate.

6. The separator of a non-aqueous electrolyte battery according to claim 5, wherein the heat-resistant porous layer further includes an inorganic filler.

7. The separator of a non-aqueous electrolyte battery according to claim 6, wherein the inorganic filler is selected from the group consisting of inorganic oxides, inorganic nitrides, poorly soluble ionic crystal particles, covalently bonded crystals, clay, materials derived from mineral resources, lithium titanium phosphate, and combinations thereof.

8. The separator of a non-aqueous electrolyte battery according to claim 5, wherein the porous substrate is a substrate including one or more resins of polyolefin resins, polyester resins, polyacetal resins, polyamide resins, polycarbonate resins, polyimide resins, polyetheretherketone resins, polyethersulfone resins, or combinations thereof.

9. A non-aqueous electrolyte battery comprising a positive electrode, a negative electrode, the separator of a non-aqueous electrolyte battery according to claim 5, and an electrolyte solution.

* * * * *